US011275599B1

United States Patent
Duong et al.

(10) Patent No.: US 11,275,599 B1
(45) Date of Patent: Mar. 15, 2022

(54) HYPERVISOR REMOTE OFFLOAD FOR VM DATA MIGRATION BETWEEN STORAGE DEVICES

(71) Applicant: Tintri by DDN, Inc., Santa Clara, CA (US)

(72) Inventors: Luong Duong, Fremont, CA (US); Mark G. Gritter, Eagan, MN (US); Soujanya Shankaranarayana, Sunnyvale, CA (US); Nikhil Pujari, San Francisco, CA (US); Kavita Agarwal, Sunnyvale, CA (US); Karthik Ravichandra, Newark, CA (US); Dattatraya Koujalagi, Sunnyvale, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 272 days.

(21) Appl. No.: 15/975,494

(22) Filed: May 9, 2018

Related U.S. Application Data

(60) Provisional application No. 62/503,715, filed on May 9, 2017.

(51) Int. Cl.
*G06F 9/455* (2018.01)
*G06F 9/48* (2006.01)
(Continued)

(52) U.S. Cl.
CPC ........ *G06F 9/45558* (2013.01); *G06F 9/4856* (2013.01); *G06F 9/5088* (2013.01);
(Continued)

(58) Field of Classification Search
None
See application file for complete search history.

(56) References Cited

U.S. PATENT DOCUMENTS 8,046,550 B2 * 10/2011 Feathergill .......... G06F 11/1466
  711/162
8,135,930 B1 * 3/2012 Mattox ............... G06F 9/45558
  711/100

(Continued)

OTHER PUBLICATIONS

Author Unknown, 2.3.33 FSCTL_PIPE_TRANSCEIVE Request, msdn.microsoft.com/enus/library/dd240221.aspx, Apr. 14, 2017.

(Continued)

*Primary Examiner* — Abu Zar Ghaffari
(74) *Attorney, Agent, or Firm* — Van Pelt, Yi & James LLP

(57) ABSTRACT

Offloading techniques to assist a hypervisor with VM data migration between storage devices are disclosed. In an embodiment, a method to offload live data migration from hypervisors includes migrating snapshots from a source device to a destination device, where the snapshots are associated with a virtual machine (VM) being migrated from a source device to a destination device. The method includes requesting a hypervisor to take a hypervisor snapshot. The method includes taking a storage array-based snapshot after requesting the hypervisor to take the hypervisor snapshot, and requesting the hypervisor to migrate live data from the source device to the destination device including by using the hypervisor snapshot to offload hypervisor live data migration. Hypervisor offload can be performed for various hypervisors and protocols including vSphere Storage APIs Array Integration (VAAI) and Remote offloaded data transfer (ODX).

17 Claims, 9 Drawing Sheets

(51) Int. Cl.
  *G06F 9/50*   (2006.01)
  *G06F 11/14*  (2006.01)
  *G06F 16/11*  (2019.01)
(52) U.S. Cl.
  CPC ........ *G06F 11/1484* (2013.01); *G06F 16/128* (2019.01); *G06F 2009/4557* (2013.01)

(56) References Cited

U.S. PATENT DOCUMENTS

| | | | | |
|---|---|---|---|---|
| 8,495,316 | B2* | 7/2013 | Nagarkar | G06F 11/1451 |
| | | | | 711/162 |
| 8,983,961 | B2* | 3/2015 | Chan | G06F 11/2097 |
| | | | | 707/737 |
| 9,026,753 | B2* | 5/2015 | Nasu | G06F 3/0608 |
| | | | | 711/162 |
| 9,715,347 | B2* | 7/2017 | Ryu | G06F 9/45558 |
| 9,760,443 | B2* | 9/2017 | Tarasuk-Levin | G06F 11/1662 |
| 9,965,306 | B1* | 5/2018 | Natanzon | G06F 9/45558 |
| 10,031,917 | B2* | 7/2018 | Kumarasamy | G06F 16/128 |
| 10,120,764 | B1* | 11/2018 | Ramachandran | G06F 11/1464 |
| 10,152,386 | B1* | 12/2018 | Ramachandran | G06F 11/1451 |
| 2008/0155169 | A1* | 6/2008 | Hiltgen | G06F 9/5077 |
| | | | | 711/6 |
| 2010/0153617 | A1* | 6/2010 | Miroshnichenko | G06F 3/0635 |
| | | | | 711/6 |
| 2011/0202919 | A1* | 8/2011 | Hayakawa | G06F 9/45558 |
| | | | | 718/1 |
| 2011/0289345 | A1* | 11/2011 | Agesen | G06F 11/2097 |
| | | | | 714/4.11 |
| 2012/0137098 | A1* | 5/2012 | Wang | G06F 3/0647 |
| | | | | 711/165 |
| 2012/0284234 | A1* | 11/2012 | Mashtizadeh | G06F 16/119 |
| | | | | 707/655 |
| 2013/0097120 | A1* | 4/2013 | Mummidi | G06F 11/2097 |
| | | | | 707/649 |
| 2015/0317209 | A1* | 11/2015 | Hsu | H04L 67/10 |
| | | | | 707/646 |
| 2016/0103738 | A1* | 4/2016 | Forgette | G06F 11/1484 |
| | | | | 707/639 |
| 2016/0335007 | A1* | 11/2016 | Ryu | G06F 9/45558 |
| 2017/0017554 | A1* | 1/2017 | Chelur | G06F 16/128 |
| 2017/0168903 | A1* | 6/2017 | Dornemann | G06F 11/2097 |
| 2017/0359414 | A1* | 12/2017 | Sengupta | G06F 9/45558 |
| 2018/0113622 | A1* | 4/2018 | Sancheti | G06F 11/2094 |
| 2018/0129523 | A1* | 5/2018 | Bryant | G06F 1/3203 |

OTHER PUBLICATIONS

Author Unknown, 2.3.77 FSCTL_OFFLOAD_READ Request, msdn.microsoft.com/enus/library/hh880616.aspx, Apr. 14, 2017.
Author Unknown, 2.3.78 FSCTL_OFFLOAD_READ Reply, msdn.microsoft.com/enus/library/hh880740.aspx, Apr. 17, 2017, pp. 1-3.
Author Unknown, 2.3.80 FSCTL_OFFLOAD_WRITE Request, msdn.microsoft.com/enus/library/hh880584.aspx, Apr. 14, 2017, pp. 1-2.
Author Unknown, 2.3.81 FSCTL_OFFLOAD_WRITE Reply, msdn.microsoft.com/enus/library/hh880539.aspx, Apr. 14, 2017, pp. 1-2.
Author Unknown, Acquiring Credentials (GSS-API Programming Guide), GSS-API Programming Guide, Apr. 14, 2017, pp. 1-2.
Author Unknown, Context Initiation (Client) (GSS-API Programming Guide), GSS-API Programming Guide, pp. 1-4.
Author Unknown, Offloaded Data Transfers, msdn.microsoft.com/windows/hardware/drivers/ifs/offloadeddatatransfers, Apr. 14, 2017, pp. 1-9.
Author Unknown, VMware VSphere Storage APIs—Array Integration (VAAI), Technical Marketing Documentation v 1.1, Dec. 2012.

* cited by examiner

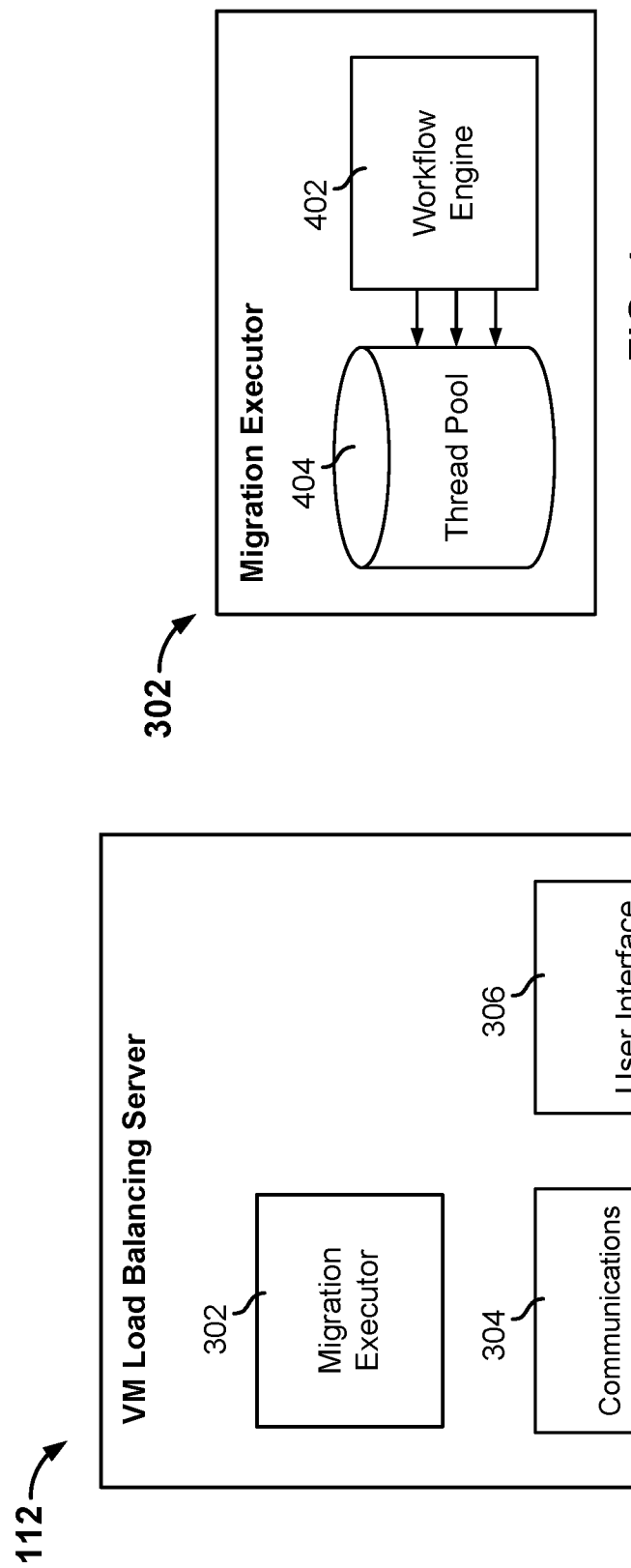

HYPERVISOR REMOTE OFFLOAD FOR VM DATA MIGRATION BETWEEN STORAGE DEVICES

CROSS REFERENCE TO OTHER APPLICATIONS

This application claims priority to U.S. Provisional Patent Application No. 62/503,715 entitled VM DATA MIGRATION BETWEEN STORAGE DEVICES filed May 9, 2017 which is incorporated herein by reference for all purposes.

BACKGROUND OF THE INVENTION

Virtual machines (VMs) are typically stored on a system of nodes (where each node is a storage device or array). VMs may have varying workloads depending on traffic handled by the VM. Depending on how VMs are distributed on the storage arrays, some nodes may become overloaded while other nodes are underloaded. VM placement can be optimized across multiple storage systems, and load balancing of VMs can be performed to optimize the use of nodes.

An example of a technique to load balance VM placement on storage arrays is Tintri® VM Scale Out, which optimizes VM placement based on storage capacity and forecasted performance needs. A load balancing recommendation is made by identifying over-committed nodes, and suggesting that VMs be migrated from those nodes to under-committed nodes. The recommended VM migration may be automatically implemented or provided to a user for approval. Some of the challenges of VM migration are ensuring proper ordering of transferred data, parallelism, and error handling. In addition, hypervisors typically perform the live data migration portion of VM migration, but typical live data migration techniques can be inefficient.

BRIEF DESCRIPTION OF THE DRAWINGS

Various embodiments of the invention are disclosed in the following detailed description and the accompanying drawings.

FIG. 3 is a diagram showing an example of a VM load balancing server.

FIG. 4 is a diagram showing an example of a migration executor.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Hypervisor offload for VM data migration between storage devices is disclosed. In some embodiments, the method uses offloading mechanisms to assist the hypervisor with migrating live data. The techniques described here find application for various hypervisors and protocols including VAAI and Remote ODX. In an embodiment, a method to offload live data migration from hypervisors includes migrating snapshots from a source device to a destination device, where the snapshots are associated with a virtual machine (VM) being migrated from a source device to a destination device. The method includes requesting a hypervisor to take a hypervisor snapshot. The method includes taking a storage array-based snapshot after requesting the hypervisor to take the hypervisor snapshot, and requesting the hypervisor to migrate live data from the source device to the destination device including by using the hypervisor snapshot to offload hypervisor live data migration.

Figure 1:
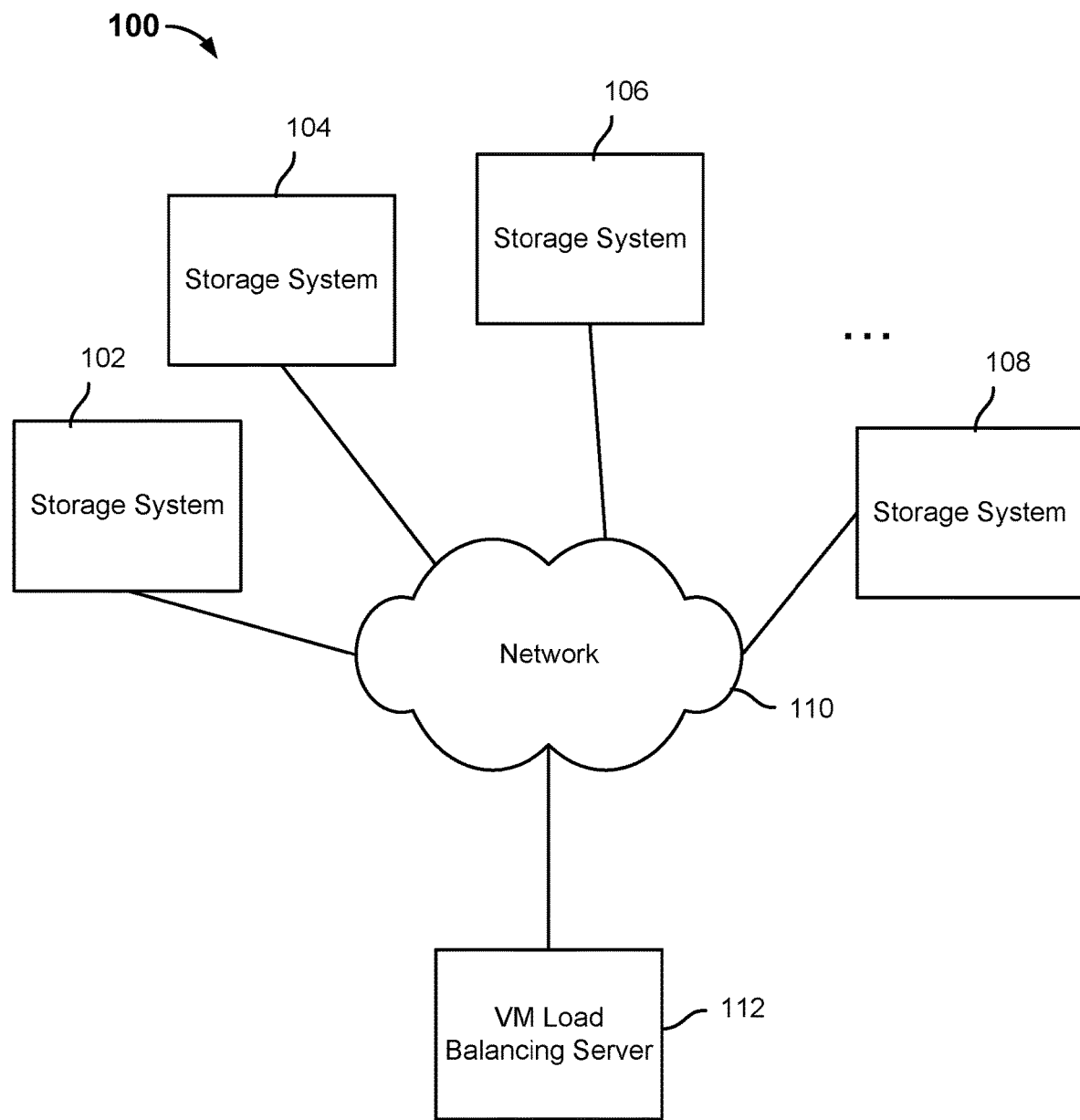
FIG. 1 is a diagram showing an embodiment of a system in which VM data is migrated between storage devices.

FIG. 1 is a diagram showing an embodiment of a system in which VM data is migrated between storage devices. The techniques described here may be applied to a system such as system 100 to migrate VM data between storage devices 102-108. In the example, system 100 includes storage device 102, storage device 104, storage device 106, network 110, storage device 108, and VM load balancing server 112. In various embodiments, network 110 includes various high-speed data networks and/or telecommunications networks. In various embodiments, storage device 102, storage device 104, storage device 106, storage device 108, and VM load balancing server 112 communicate with each other over network 110.

In the example, each of storage device 102, storage device 104, storage device 106, and storage device 108 store data related to one or more VMs for which data is currently stored on the respective storage device. Each of storage device 102, storage device 104, storage device 106, and storage device 108 is configured to store historical data at different historical points in time with respect to the VMs that are currently and/or have previously resided at that storage device. Each of the storage devices may be implemented by a storage array. An example of a storage device is Tintri VMstore®. In some embodiments, VM load balancing server 112 is configured to keep track of which VMs currently reside at which storage device and coordinate migration of VM data between storage devices. In some embodiments, a VM may have data stored at different storage devices and is referred to as "multi-component VMs." In some embodiments, VM load balancing server 112 is configured to store aggregated historical data associated with a multiple-component VM.

VM load balancing server 112 (sometimes called a cluster VM management server) is configured to perform, in cooperation with associated storage devices, migration of VM data from one storage device to another storage device in system 100. In some embodiments, the data migration is performed according to a recommendation determined by the VM load balancing server. For example, the VM load balancing server obtains historical data corresponding to various VMs from the storage devices at which the VMs reside and use the historical data to generate predicted metrics (e.g., a probability that a particular event, which is sometimes referred to as a "metric type," may occur at any point within a window of time in the future) for each storage device based on the historical VM data obtained from that storage device.

At least two of storage device 102, storage device 104, storage device 106, and storage device 108 may be defined by a user to be included in the same pool of storage devices. In various embodiments, a pool of storage devices comprises storage devices that share at least one common attribute (e.g., the storage devices are located within the same geographic area and/or are owned by the same entity). After VM load balancing server 112 has generated a storage device specific predicted metric data structure for each storage device in a pool, VM load balancing server 112 is configured to combine the storage device specific predicted metric data structures associated with the storage devices in the pool into a combined, pool-level predicted metric data structure. Each combined predicted metric of the combined predicted metric data structure represents the predicted probability that the event of the corresponding metric type will happen at any point to any storage device in the pool in a configured window of time in the future.

One or more VMs can be selected for migration from their source storage devices within the pool to a different destination storage device within the pool as follows. VM load balancing server 112 identifies one or more predicted metrics within the combined predicted metric data structure that are to be improved (e.g., lowering the probability that the undesirable event will happen to below a threshold level).

VM load balancing server 112 is configured to migrate the data of the VMs included in the recommendation from their respective source storage device(s) to their destination storage device(s) by instructing the source storage device to migrate snapshot data and to instruct a hypervisor to migrate live data as further described below. In some embodiments, after migration, historical data is updated to correspond to data of only VMs that are actually residing at each storage device such that future recommendations based on predicted metrics use accurate historical data.

Figure 2:
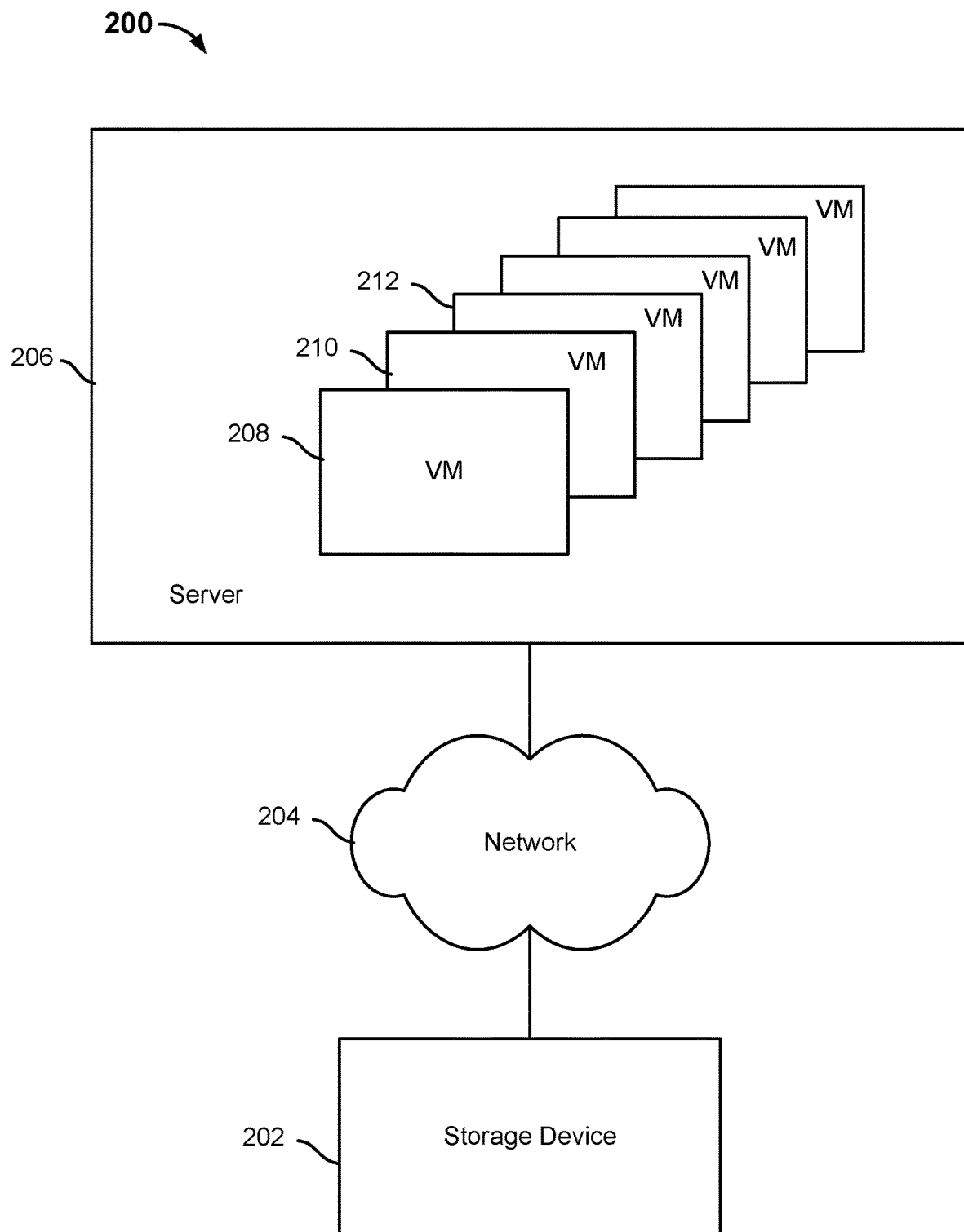
FIG. 2 is a diagram showing an embodiment of a storage device for the storage of VMs using virtual machine storage abstractions.

FIG. 2 is a diagram showing an embodiment of a storage device for the storage of VMs using virtual machine storage abstractions. Each of storage devices 102, 104, 106, and 108 of system 100 of FIG. 1 may be implemented using a storage device such as storage device 202 of system 200.

In the example shown, system 200 includes server 206, network 204, and storage device 202. In various embodiments, network 204 includes various high-speed data networks and/or telecommunications networks. In some embodiments, storage device 202 communicates with server 206 via network 204. In some embodiments, the file system for the storage of VMs using VM storage abstractions does not include network 204, and storage device 202 is a component of server 206. In some embodiments, server 206 is configured to communicate with more storage systems other than storage device 202.

In various embodiments, server 206 runs several VMs. In the example shown, VMs 208, 210, and 212 (and other VMs) are running on server 206. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be migrated from one physical machine to another using the techniques described here. The server 206 may be implemented by or include a hypervisor. Example hypervisors are VMware vSphere® and Microsoft® Hyper-V.

In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage device as one or more files. In various embodiments, the files are examples of VM storage abstractions. In some embodiments, the respective files associated with (at least) VMs 208, 210, and 212 running on server 206 are stored on storage device 202.

In various embodiments, storage device 202 is configured to store meta-information identifying which stored data objects, such as files or other VM storage abstractions, are associated with which VM or vdisk. In various embodiments, storage device 202 stores the data of VMs running on server 206 and also stores the metadata that provides mapping or other identification of which data objects are associated with which specific VMs. In various embodiments, mapping or identification of specific VMs includes mapping to the files on the storage that are associated with each specific VM. In various embodiments, storage device 202 also stores at least a portion of the files associated with the specific VMs in addition to the mappings to those files. In various embodiments, storage device 202 refers to one or more physical systems and/or associated hardware and/or software components configured to work together to store and manage stored data, such as files or other stored data objects.

In some embodiments, a hardware component that is used to (at least in part) implement the storage device may be comprised of one or a combination of multiple tiers of storage types. For example, storage device 202 may include tiers of storage types such as hard disk drive (HDD or "disk") and/or solid state drive (SSD or "flash"). In various embodiments, a type of storage is considered to be in a higher tier if it has faster accesses relative to a type of storage that is considered to be in a lower tier. In various embodiments, the higher tier type of storage (e.g., flash storage) at storage device 202 is configured to store more frequently accessed and/or otherwise higher priority VM data and lower tier type of storage (e.g., disk storage) at storage device 202 is configured to store less frequently accessed and/or otherwise lower priority VM data.

FIG. 3 is a diagram showing an example of a VM load balancing server. VM load balancing server 112 of FIG. 1 may be implemented as shown in FIG. 3. Here, the VM load balancing server includes migration executor 302, communications interface 304, and user interface 306.

Migration executor 302 is configured to manage migration of VM data from a source device to a destination device. The source and destination devices may be storage devices (such as devices 102-108 shown in FIG. 1). In various embodiments, the migration executor manages execution of the migration including by providing progress, handling errors, and providing feedback about a result of the migration execution. In some embodiments, the VM load balancing server creates the migration executor in response to receiving a request to migrate VM data. Migration executor 302 may be implemented using a hardware processor and/or software processor.

VM data migration involves moving data associated with a VM, which may include different types of data such as live data and snapshot data. Live data describes a current state of a VM, while snapshot data captures a state of a VM at a specific point and time and can be used to reconstruct a state of a VM or revert a VM to an earlier state. The migration executor instructs a source device to migrate snapshot data, and instructs a hypervisor to migrate live data. The migration executor migrates snapshot data from the source device to the destination device. For example, the migration executor migrates snapshot data by setting up a migration path and creating a migration configuration in the source device. The migration executor requests a hypervisor to migrate the live data from the source device to the destination device. After data has been moved from a source device to a destination device, the migration executor removes the configuration, and snapshot data from the source as well as the migration path.

User interface 306 may be configured to provide feedback and receive instructions from a user. For example, a user approves a recommendation via a user interface. For example, a cluster VM management server UI allows the user to view and approve a load balancing recommendation. This causes the recommendation to be sent to the migration executor, and the migration executor proceeds to execute the recommendation by migrating VM data associated with the recommendation.

Messages relating to migration such as progression, successful completion, errors, failures, and the like can be provided via the user interface. In some embodiments, the progress is interactive and displayed in response to a user request. For example, a user can view the progress of migration by selecting the pool of storage devices (e.g., Tintri VMstore® pool) associated with the recommendation. The progress of the migration of data within that pool can be represented in various text or graphical forms conveying information about the status or progression of migration such as how many VMs have been migrated and how many have not yet been migrated. User interface 306 may be implemented by a graphical user interface or display device.

Communications interface 304 may be implemented by hardware and/or software devices for communicating with remote devices. For example, migration executor 302 may use the communications interface to instruct a remote hypervisor (such as a hypervisor associated with server 206) to migrate live data.

In some embodiments, the migration request received by the migration executor is a migration recommendation. In some embodiments, the recommendation is made based on a load balancing determination after it is programmatically predicted that the migration of the VM will improve one or more metrics (e.g., space usage, load, or flash hit rate) associated with a pool of devices that includes both the source device and the destination device.

The VM load balancing server 112 is sometimes called "a cluster VM management server." The cluster VM management server is configured to a coordinate among multiple storage devices (e.g., Tintri VMstore®). In some embodiments, the functionality of the cluster VM management server lives on a specific one of the storage devices, but the cluster VM management server is able to communicate with several storage devices, set up their configurations, initiate movement of snapshots, and communicate (directly or indirectly) with a hypervisor to create hypervisor snapshots and initiate live migration.

For simplicity, the example described here focuses on the components that execute VM data migration. In various embodiments, a VM load balancing server may include additional, fewer, and/or different components than those described in FIG. 3. Sometimes, the VM data migration is performed according to a recommendation generated by the same VM load balancing server. For example, the VM load balancing server may include components to generate a set of recommendations that includes selections of one or more sets of VMs to be moved from their current storage device(s) to respective new destination storage device(s) within the same pool. In some embodiments, each recommendation identifies the VMs to move, the source storage device(s) of the VMs, the destination storage device(s) of the VMs, and the expected benefit of the migration (e.g., the combined predicted metric of which metric type is predicted to be improved as a result of the migration). The VM load balancing server may include components to generate predicted metrics related to access rate or space usage such as by modelling predicted metrics at the storage device (or storage pool to which the storage device belongs).

FIG. 4 is a diagram showing an example of a migration executor. Migration executor 302 of FIG. 3 may be implemented as shown in FIG. 4. The migration executor carries out migration of VM data from a source device to a destination device. For example, the migration executor receives a list of one or more VMs that is to be migrated from a source device to a destination device. To execute the migration, the migration executor configures source and destination devices to move snapshot data and directs a hypervisor to move live data associated with the VMs.

In the example shown, the migration executor includes workflow engine 402 and thread pool 404. Workflow engine 402 is configured to coordinate tasks for migrating a VM from a source device to a destination device. In various embodiments, based on the requested migration (which may be a list of VMs to be migrated), the workflow engine creates workflow(s) to perform the individual VM migrations.

In some embodiments, the VMs to be migrated are arranged into groups that are based on their order of migration. All the VMs in the same group may be migrated in parallel, while the VM groups are executed in serial, in some embodiments. In some embodiments, the order that the VM groups appears in the recommendation list determines an order of execution. In some embodiments, the next VM group execution starts only after the successful completion of the preceding VM group.

In various embodiments, when a VM group is executed, a VM migration workflow is created for each VM in the group. A VM migration workflow includes a series of tasks to complete for each VM migration. The outcome of each task determines the next task that the workflow will perform. In various embodiments, a workflow is terminated when all the tasks are completed, one of the tasks fails, or the user aborts the migration.

A workflow includes a sequence of tasks. Examples of such tasks include snapshot migration, live data migration, deleting snapshots, and creating and destroying VM and datastore migration configurations. The live data migration typically involves cooperation of a hypervisor. For example, storage vMotion® is VMware's mechanism for live migration of running VMs from one device to another.

In various embodiments, the workflow tasks are executed in a certain order. Each task may involve one or more commands. When executing a command, the task will retry the command for a period of time if the failure is estimated to be intermittent or is correctable by the user. If a task fails, the migration terminates and, if the migration is being performed based on a recommendation, the recommendation execution is marked as failed.

Thread pool 404 is configured to manage the workflows generated by workflow engine 402. The thread pool dequeues a workflow and executes it. The thread pool's size is set to the maximum number of allowed concurrent active VM migrations per recommendation.

In various embodiments, the migration executor provides an interface to allow other components to monitor the progress of the execution. e.g., for display on a user interface or logging. If the migration is being performed in response to a load balancing recommendation, the progress of the recommendation is also updated.

In some embodiments, a workflow may be interrupted. Recovery can be performed as follows. The runtime state of the workflow can be persisted in a database, allowing a VM load balancing server to restore the state of execution of all running workflows in case the VM load balancing server restarts. Each instance of a running migration executor and its active workflows are persisted in a database. For example, the workflow state is persisted as a JSON string. Every time the state of the migration executor and its workflows change, the object is written to the database. When the VM load balancing server tomcat is restarted, each migration executor and its workflows are re-instantiated from the data persisted in the database. Each migration executor recovery task includes validating whether the recommendation is still valid before resuming associated work. If it is determined that the recommendation is no longer valid, a message will be logged and the migration executor is destroyed. The following figure shows an example sequence of tasks for a VM migration workflow.

As more fully described below, errors or failures may occur in the system in association with VM data migration. One type of error is related to a VM load balancing server (e.g., server 112 of FIG. 1). The VM load balancing server may crash, reboot, perform a software upgrade, and the like without disrupting the VM data migration. The VM load balancing server may become temporarily disconnected from storage devices. The migration process is able to recover and continue after such temporary disruptions.

Another type of error relates to hypervisors. For example, VM live migration fails due to a hypervisor component (e.g., VMware vCenter®) rejecting the VM relocation request. This may be handled as follows. The workflow engine logs the error, and updates the recommendation state along with the error cause. The migration executor then proceeds to clean up the allocated resources and terminates. A corresponding error message and recommendation result may be displayed on a user interface.

Figure 5:
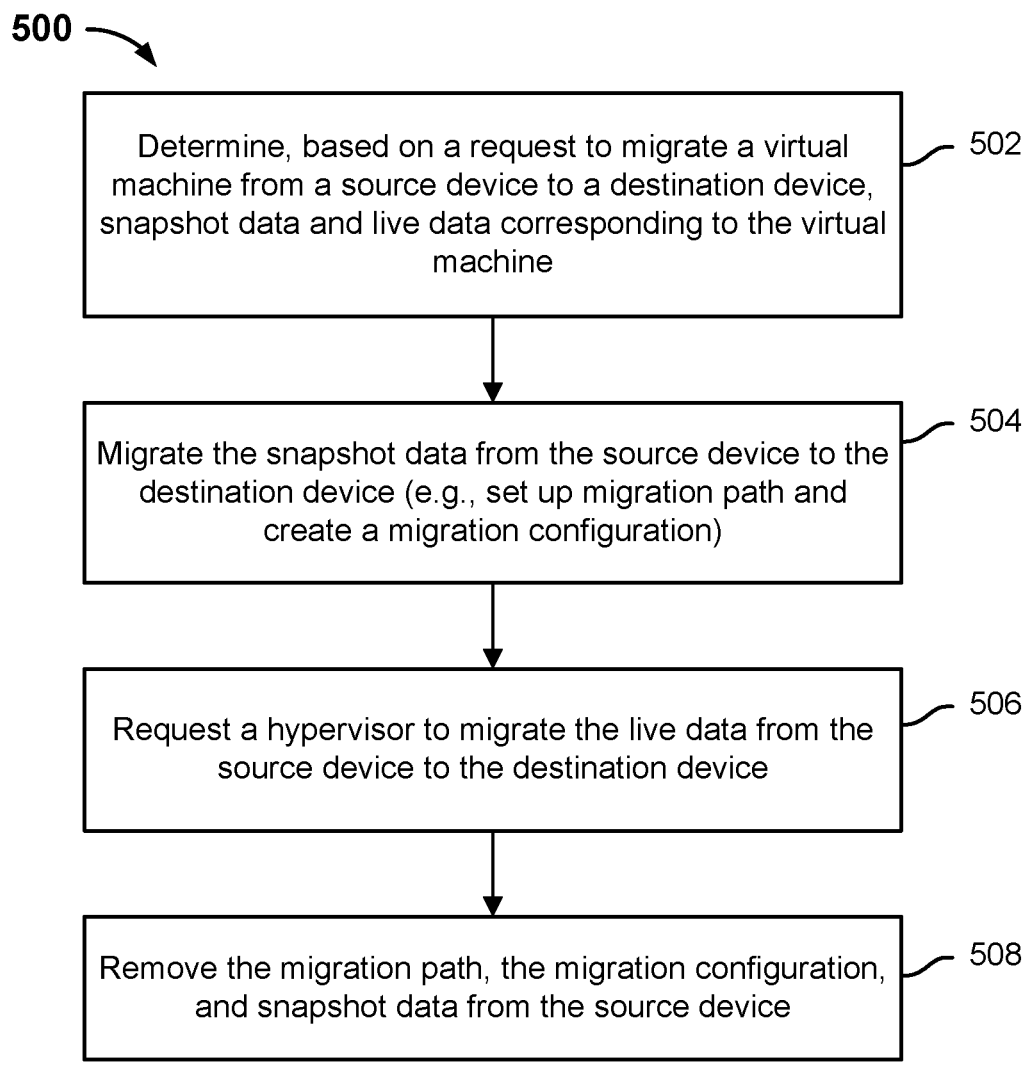
FIG. 5 is a flowchart illustrating an embodiment of a process for VM data migration between storage devices.

FIG. 5 is a flowchart illustrating an embodiment of a process for VM data migration between storage devices. Process 500 can be performed by a VM load balancing server such as server 112 of FIGS. 1 and 3.

Snapshot data and live data corresponding to a VM is determined (502). The determination is based on a request to migrate the VM from a source device to a destination device. In some embodiments, a VM is made up of several types of data such as snapshot data, live data, and the like. Moving a VM from one device to another device can be performed efficiently by identifying the relevant snapshot data and relevant live data and migrating the identified data without migrating other data. Other systems that do not have VM-level visibility or VM-awareness (e.g., awareness of which VM a file belongs to) is unable to determine which snapshots to move, and thus typically moves all of the snapshots, which consumes a great deal of bandwidth and computing resources.

In some embodiments, in addition to snapshot data and live data, working set data is identified and migrated. Working set data refers to which blocks are most frequently accessed. Copying working set data from a source device to a destination device effectively warms a cache, helping the VM to perform more efficiently after its associated data has been migrated from a source device to a destination device. This is because cache that is already warmed does not need to learn access habits by observing how the VM is used.

Snapshot data is migrated from the source device to the destination device (504). For example, a migration path is set up between the source device and the destination device, and a migration configuration is created in the source device. The migration configuration includes information a replication protocol uses to move data. A snapshot can be moved by an application programming interface (API) to a storage device according to a replication protocol. A copy of the snapshot is created at the destination device, and the corresponding snapshot is deleted from the source device. In various embodiments, if there are any interruptions or errors during snapshot migration, the migration can be reverted and the source and destination devices can return to an earlier state (before snapshot migration). The progress of migrating snapshots between the source device and the destination device is monitored, in some embodiments.

In various embodiments, the migration configuration is created on a source device as follows. Storage devices typically store information about replication such as permitted actions or forbidden actions. A migration configuration can be based on information looked up for the source device and destination device. If replication information for the source device or destination device indicates that traffic is not allowed, then the migration process may terminate with an error indicating that migration is not permitted. For example, an "allow traffic" attribute indicates whether traffic is allowed or when traffic is allowed. Sometimes, a storage device may not permit traffic at certain times of day or when handling a high volume of traffic. For example, a storage device permits data migration during off-peak hours in order to ensure a quality of service for other operations during peak hours. As another example, migration may be prohibited, by policy, from a storage array that encrypts data to a storage array that does not encrypt data. In some embodiments, the status of the "allow traffic" setting is monitored for a period of time. If traffic is not allowed at any time during the period of monitoring, then migration terminates and fails. If the "allow traffic" setting changes to true, then the workflow continues to a next migration task, e.g., snapshot migration. Sometimes, storage devices do not have stored information about replication. In this situation, a default migration configuration can be used. The migration configuration information includes sufficient information to enable replication traffic on all of the participating storage devices.

Errors may occur in association with snapshot migration such as when a migration configuration is created. If a storage device is down, there is no valid session, or an API request times out, the VM load balancing server may indicate an error or retry for N hours before it fails the migration task, where N is a user-configurable time frame. If migration information is unavailable and cannot be updated, the migration task may fail in some embodiments. If an API call returns a failed snapshot configuration or invalid request, then the migration task fails. If a resource is not found, the migration task terminates.

A hypervisor is requested to migrate the live data from the source device to the destination device (506). The request may be made by sending a REST API call to a hypervisor to request the hypervisor to move live data (e.g., current, non-snapshot data) associated with the VM from the source device to the destination device. Using the example of VMware vMotion®, a request can be made to a hypervisor or to a storage array that contacts on the hypervisor to migrate live data, and saving the returned task object for monitoring. In other words, a hypervisor API call, in various embodiments, is wrapped inside a REST API. In one aspect, this enables a load balancing server that does not have credentials to communicate with the hypervisor. In another aspect, the storage array associated with the load balancing server may have its own optimizations, and the storage array can be informed of what is happening instead of inferring storage migration via another mechanism. The progress of live data migration is monitored by periodically checking the task object, e.g., by calling "GET /task/{id}" to retrieve the task status. The task may have various states such as queued, running, success, failed, cancelled, cancel is pending, acknowledged, etc. If the state indicates success, then live migration has completed successfully. This means that live data has been read from the source device and written to the destination device. In some embodiments, following live data migration, data is de-duplicated.

At least some of the tasks associated with live data migration performed by a hypervisor can be offloaded by the VM load balancing server. When the VM load balancing server assists with live data migration, the process may vary as further described below, e.g., with respect to FIGS. 8-10. In various embodiments, the functioning of the computer is improved by migrating snapshot data prior to migrating live data because the process is revertable during the snapshot migration and undoing tasks is less expensive compared with a process in which live data is migrated before snapshot data is migrated.

Errors may occur in association with requesting a hypervisor to migrate live data. If a storage device is down or there is no valid session, the VM load balancing server may indicate an error or retry for N hours before it fails the migration task, where N is a user-configurable time frame. If the response to the API call is an error, the VM load balancing server determines whether a VM was deleted from a storage device. If a VM was deleted, then this is not considered an error, and the VM load balancing server requests the hypervisor to terminate live migration (e.g., end the vMotion® task) and moves on to the next workflow task. Otherwise, if a VM was not deleted, the live migration has failed.

Errors may occur in association with monitoring the live migration status. For example, when a task object is used to monitor progress, a call to the task object may return an error that the task is not found. The task might not be found because the task was completed and deleted or the task was not created in the first place. The VM load balancing server can determine the reason for why the task was not found by querying the source device or the destination device to see if the VM was migrated. In some embodiments, live migration is considered to have failed if there was a log error (e.g., source or destination device did not see the VM migrated), if the API call returns an error, or if the task state is failed, cancelled, or cancel pending.

Various messages may come up when monitoring live data migration. For example, if the hypervisor indicates that the relocated VM resource is not found, then the VM load balancing server, in various embodiments, treats this as a successful live migration but updates a result error summary field with the message returned from a storage device in association with the migration.

In various embodiments, the VM load balancing server determines whether an error is correctable or non-correctable. The VM load balancing server, in various embodiments, determines whether an error is correctable based on feedback from a hypervisor. If an error is correctable (such as a loss of connection to a storage device due to authentication error), the user is informed and the action is retried for N hours (where N is a user configurable value), in some embodiments. For example, if the hypervisor indicates that there is a configuration error, the VM load balancing server, in various embodiments, treats this as a correctable error condition. The VM load balancing server may sleep for a short time and reattempt relocating the VM later. If the error is not correctable, the task will end immediately and fail the migration, in some embodiments. For example, if the hypervisor indicates that the relocation of a VM failed, the VM load balancing server, in various embodiments, treats this as a non-correctable error and fails the migration task.

In various embodiments, monitoring the migration process includes polling a VM for the latest migrated snapshot time. If the time is at least equal to a calculated target snapshot migration time, then the snapshot migration is complete. An error in the migration process can be detected by periodically polling the remote VM's migration configuration error attribute. If an error field is set, then this indicates an error with the migration link. If migration has stopped or stalled, for example as indicated by no new update for the latest migrated snapshot time or migration takes more than a threshold allowed time, then the workflow times out and migration fails. The threshold time allowed for migration can be user-defined. If a storage device is down, there is no valid session, or an API request times out, the VM load balancing server may indicate an error or retry for N hours before it fails the migration task, where N is a user-configurable time frame. If a storage device returns an error in a virtual machine migration configuration object, this may be due to a collision in the destination device, e.g., trying to store a snapshot in a location that is already occupied.

The migration path, the migration configuration, and snapshot data are removed (508). In various embodiments, after verifying that all data is in sync (e.g., no snapshots have been lost in migration), then migration path, migration configuration, and snapshot data are removed. In some embodiments, instead of removing configuration, the configuration is instead disabled. In some embodiments, the migration path between the source and destination devices, and VM migration configuration on the source device are deleted via API calls to the source and/or destination devices. In some embodiments, a REST API call is sent to a source device to delete snapshots from the source device. A snapshot is removed from the source device after the VM data has been successfully migrated to the destination device.

In some embodiments, the migration configuration is removed as follows. The VM load balancing server verifies that the snapshot is up to date on the destination storage device. If the snapshot is not up to date, the VM load balancing server continues to check periodically and waits until the migrated snapshot is current. When the migrated snapshot is current, the VM migration configuration is deleted. For example, a call such as "DELETE/v310/vm/{vmId}/migrationConfig" is made. Then, the storage device configuration is disabled. For example, a call such as "PUT/v310/datastore/{UUID}/replicationInfo" is made with parameters set to stop incoming and outgoing traffic.

Errors may occur in association with removing the migration configuration. If a storage device is down, there is no valid session, or an API request times out, the VM load balancing server may retry for N number of times, where N is a user-configurable number such as twice. If there is no success after the N number of attempts, the VM load balancing server logs the error, and the storage device proceeds to garbage collect the unused VM migration configuration. If the API call returns a resource not found or a delete snapshot migration failed message, then an error is logged.

In some embodiments, the snapshot data is removed from the source device as follows. The VM load balancing server determines whether a VM replication configuration is to be removed before removing the snapshot data. If VM replication configuration should be removed and is not removed, then when replication is performed, an error will be thrown indicating that a snapshot is needed for replication. To remove the snapshot data, a call such as "Delete/v310/snapshot/?vmUuid={Remote VM tintriUUID}" is made.

Errors may occur in association with removing snapshot data. If a storage device is down, there is no valid session, or an API request times out, the VM load balancing server may retry for an indefinite period of time. If an API call returns an error such as invalid query parameter value or delete snapshot at least partially failed, the VM load balancing server fails migration, providing an error indicating the reason. In some embodiments, in an architecture in which a file system is unable to delete snapshots, the VM load balancing server disregards an error that a delete snapshot partially failed if the VM has snapshots that were used to clone other VMs.

In some embodiments, process 500 can be terminated or aborted at any time by a user. For example, the user can instruct the migration to terminate via a user interface. Upon receiving a termination instruction, the migration executor is notified and proceeds to cancel the execution of the migration as follows. All in-progress VM migrations are stopped and canceled. In some embodiments, the migration executor cleans up allocated resources. The VM load balancing server does not revert all previously-completed VM migrations. The user may want to terminate the migration for a variety of reasons. For example, the user notices that there is high IOPS from the storage devices in the pool after the recommendation has been approved.

Figure 6:
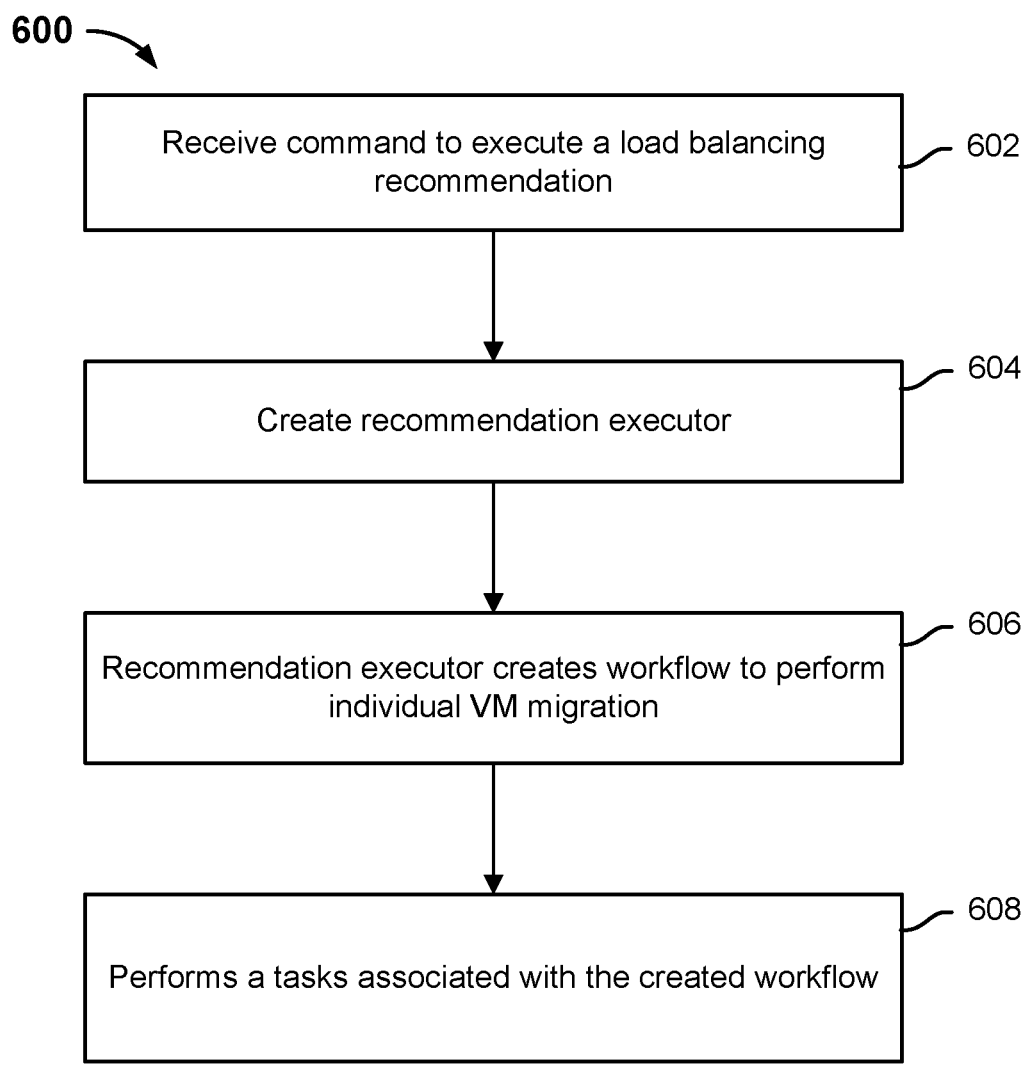
FIG. 6 is a flowchart illustrating an embodiment of a process for executing a load balancing recommendation.

FIG. 6 is a flowchart illustrating an embodiment of a process for executing a load balancing recommendation. Process 600 can be performed by a VM load balancing server such as server 112 of FIGS. 1 and 3. A load balancing recommendation can be executed by using the VM data migration process of FIG. 5.

A command to execute a load balancing recommendation is received (602). As described above, the recommendation can be a determination made by a VM load balancing server to move data from one storage device to another storage device. The recommendation may help with load balancing by moving one or more VMs from an overloaded node (storage device) to another node (storage device). The recommendation may include a list of VMs, and the VMs may be categorized into one or more groups.

A recommendation executor is created (604). In various embodiments, one migration executor instance is created for each running recommendation execution. For example, the migration executor iterates through the recommendation's VM group list. In some embodiments, each VM group is executed in serial.

A workflow is created by the recommendation executor to perform individual VM migration (606). For each VM in the VM group, the migration executor creates a VM migration workflow, and adds it to the workflow queue. The migration executor has a thread pool which will de-queue each workflow and execute it. The thread pool's size is set to the maximum number of allowed concurrent active VM migrations per recommendation.

Tasks associated with the created workflow are performed (608). In various embodiments, the tasks include migrating snapshot data from a source device to a destination device, requesting a hypervisor to migrate live data, and cleaning up the migration by removing any migration paths and configurations created for the migration as well as removing snapshot data from the source device. An example of task execution is process 500 of FIG. 5.

The migration process described here improves the functioning of a computer by more efficiently and cleanly migrating data from one storage device to another storage device. In one aspect, the VM migration does not overload storage devise with snapshot and live migration requests. In another aspect, the VM migration does not slow down the performance of other services in a VM load balancing server.

In various embodiments, a storage array (e.g., a VM load balancing server associated with the storage array) can assist a hypervisor with copying live data. This assistance is called "offloading" in this disclosure. Offloading is typically performed by using an API framework to enable certain storage tasks to be offloaded from the hypervisor to the underlying storage array. Hypervisors such as VMware® ESX and Microsoft Hyper-V® support offloading of VM migration or provisioning of new VMs to storage arrays. In the context of VM data migration, offload mechanisms are implemented by the storage array to perform some functions associated with copying live data.

Figure 9:
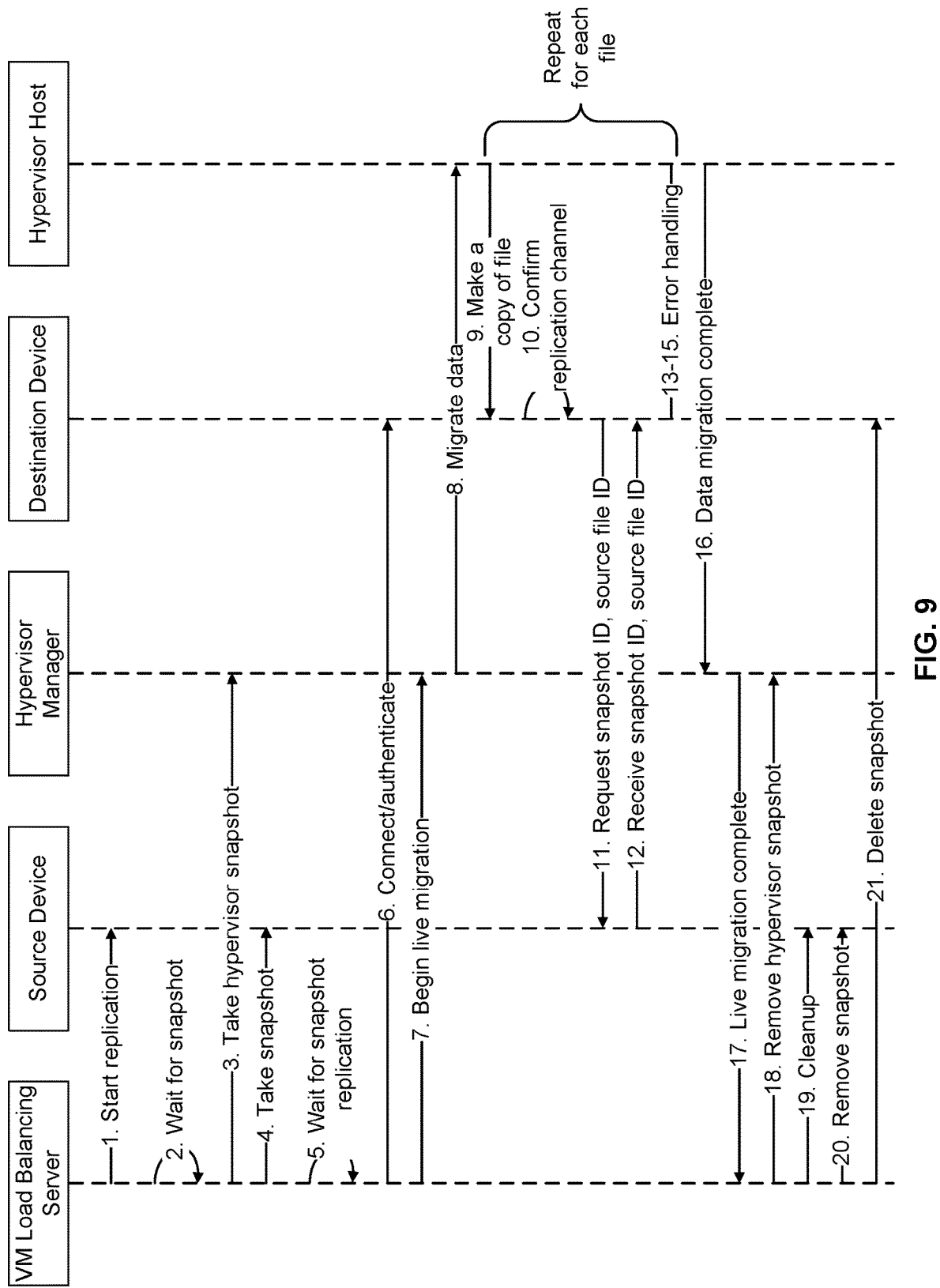
FIG. 9 shows an example of a process for migrating live data between storage devices.
Figure 10:
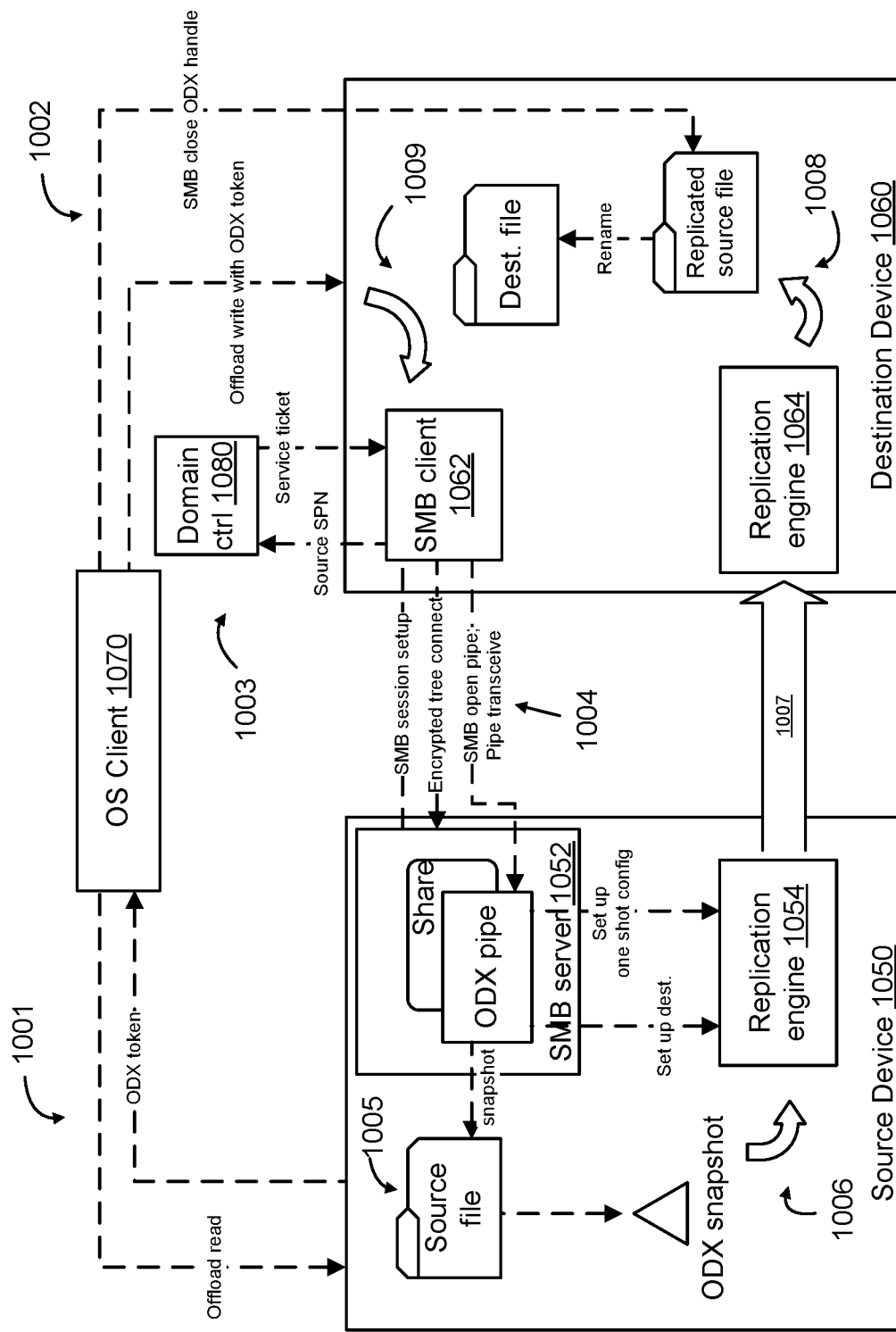
FIG. 10 shows an example of performing a remote offload.

There are inefficiencies in typical live data migration. Because the hypervisor host is unaware of exactly which blocks within a file need to be moved, the hypervisor typically reads entire files associated with a VM to be moved, and writes all of the files to the destination without performing compression or de-duplication. The blocks that are moved for migration are those that are non-zero, because zero blocks have not been written to and do not need to be moved. In typical live migration, locations within the virtual disk that have never been written to are nevertheless read, which is inefficient. The offloading techniques described below reduces the work performed by the hypervisor host by using an efficient protocol to instruct the hypervisor to move relevant files for live data migration. For example, the VM load balancing server is aware of block association with VMs, and thus knows what data needs to be moved. The VM load balancing server can use this knowledge to guide the hypervisor in performing the live data migration such that the hypervisor does not need to read entire files and write entire files when only a portion of the file is relevant for a VM migration. The following figures show examples of offloading. FIG. 9 is an example of offloading in a VMware® environment. FIG. 10 is an example of offloading in a Windows® environment.

Embodiments of supporting offloading of live migration for VMware® VMs across storage arrays by leveraging VMware® vSphere Storage APIs Array Integration (VAAI) offload APIs are described herein. In a VMware® environment, the typical file protocol used is NFS and the offload control is called VAAI. In various embodiments, techniques used for snapshot replication are used to help perform the live migration (vMotion) of VMware® VMs between a source storage array and a destination storage array.

Figure 7:
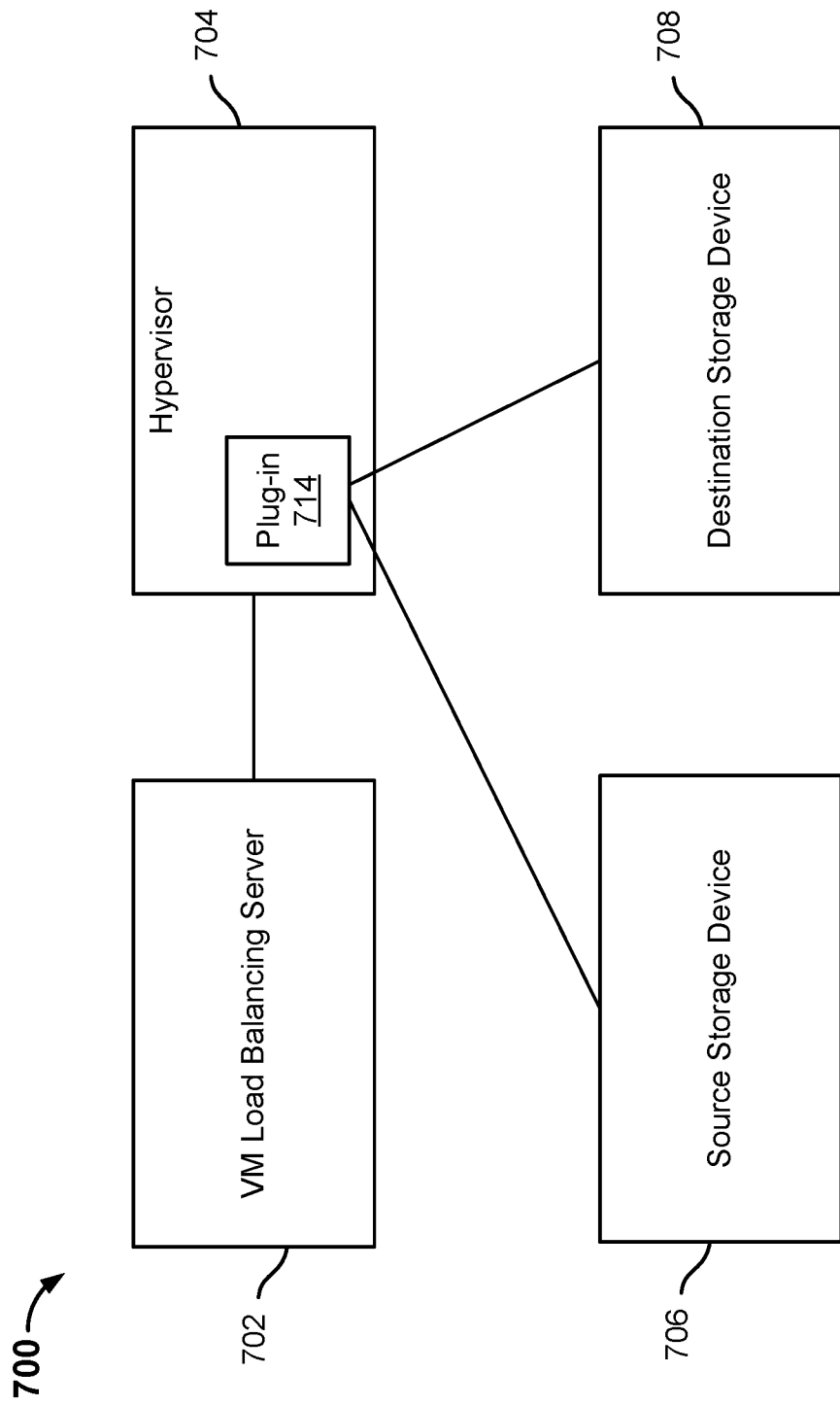
FIG. 7 is a block diagram of an embodiment of a system for offloading.

FIG. 7 is a block diagram of an embodiment of a system for offloading. System 700 includes a VM load balancing server 702, a hypervisor 704, a source storage device 706, and a destination storage device 708.

The VM load balancing server 702 is configured to migrate snapshot data associated with a VM from one storage device to another storage device. The VM load balancing server 702 is configured to perform a process such as the one shown in FIG. 8, to offload some of the operations performed by hypervisor 704.

The hypervisor 704 is configured to migrate a VM from one storage device to another storage device by moving live data associated with the VM to be migrated. In this example, the hypervisor includes a plug-in 714 to perform operations with respect to the source or destination devices. For example, the plug-in is distributed by the VM load balancing server 702 to the hypervisor 704. The VM load balancing server 702 is aware of the source and destination device configurations as well as files associated with VMs and stored on the source or destination devices. The plug-in 714 enables the hypervisor to perform operations such as clone files on a storage device. In various embodiments, the hypervisor is able to copy data from one storage device to another storage device provided that the data is from a "cold" (non-active) file in which only reads are permitted and writes are not permitted.

When a live data migration (vMotion®) request is issued to a hypervisor, the request is translated into a VAAI clone operation to a filesystem associated with a VM load balancing server. A VAAI clone operation is issued to a destination device, and contains information about the source such as the remote IP, remote mount point, local mount point, source file to clone from, and destination file to clone into.

VAAI also supports a polling mechanism where the VMware ESX® host regularly polls the file system of the destination device for the progress on offloaded vMotion. In various embodiments, vMotion is offloaded via VAAI only for "cold" files (files in which only reads are allowed) and not for "warm" files (files to which writes are permitted or being made). Thus, the VM load balancing server can help prepare "cold" files to influence offloading.

In various embodiments, "cold" files comprise files in powered off VMs or other VMs that are not actively being written to. In some embodiments, for powered on VMs, offloading is triggered only if a VM has hypervisor snapshots. In some embodiments, for a powered on VM, the VMware® hypervisor first creates a VMware® snapshot. The VMware® snapshot comprises one or more delta files relative to the powered on VM and new writes will be performed on the delta files, leaving the powered on VM unchanged after the creation of the VMware® snapshot.

The storage devices 706 and 708 are configured to store data related to one or more VMs. In this example, storage device 706 is called the source storage device because data is moved from this device to the destination storage device 708. Examples of storage devices are devices 102-108 of FIG. 1. A VM can be represented by several types of data such as live data and snapshot data. The VM can be stored on a storage device as a flat file, such as a vmdk file.

Figure 8:
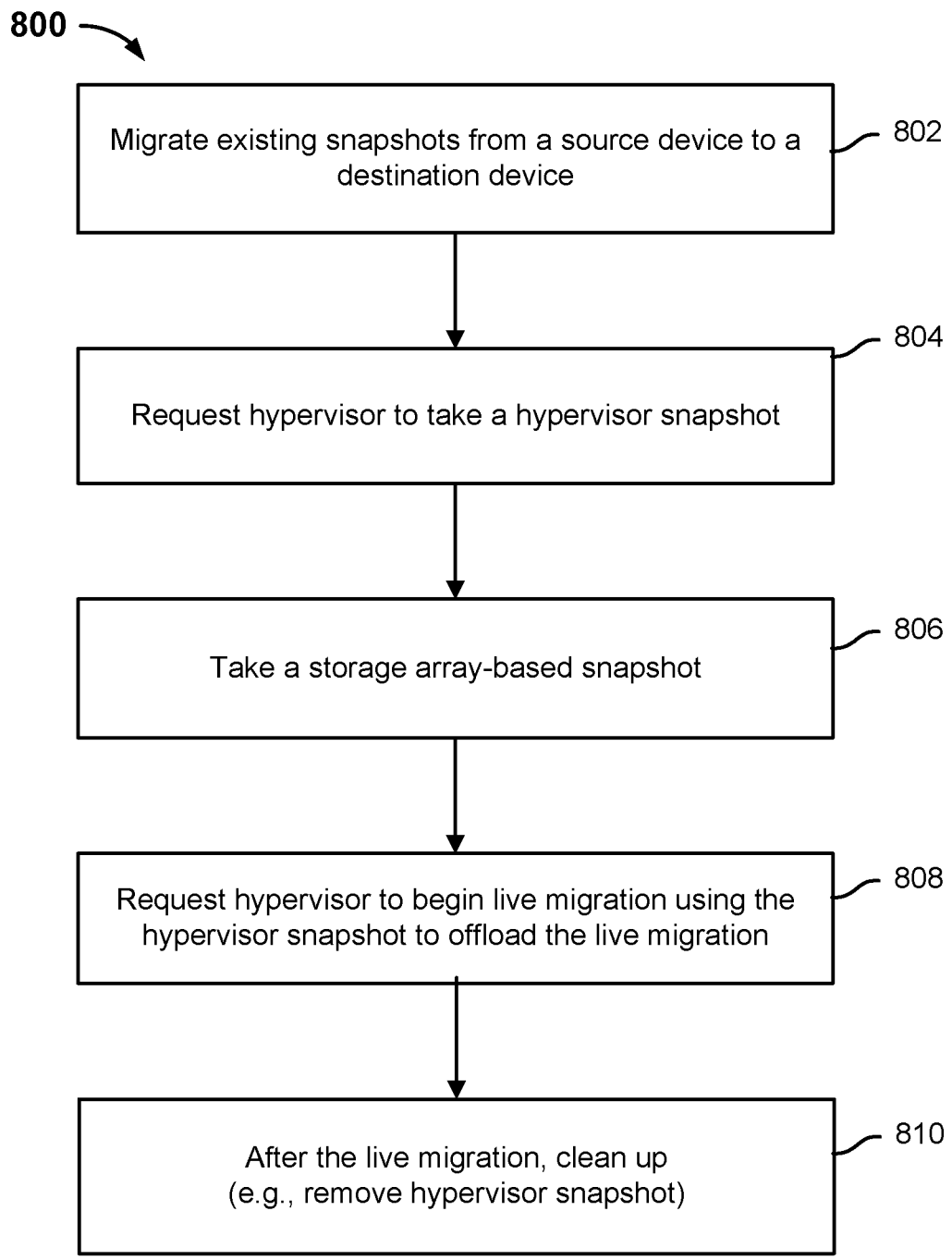
FIG. 8 is a flowchart illustrating an embodiment of a process for offloading live data migration between storage devices.

FIG. 8 is a flowchart illustrating an embodiment of a process for offloading live data migration between storage devices. Process 800 can be performed by a VM load balancing server such as server 112 of FIGS. 1 and 3. Process 800 can be performed as part of another process, for example as part of 506 of FIG. 5.

Existing snapshots are migrated from a source device to a destination device (802). Referring to FIG. 7, VM load balancing server 702 manages migration of existing storage array-based snapshots from source device 706 to destination devices 708. The existing snapshots can be migrated according to a replication protocol specified by the VM load balancing server.

Returning to FIG. 8, a hypervisor is requested to take a hypervisor snapshot (804). This creates a set of delta files to which new writes to the target VM will be written. After the set of delta files is created, a file representing a target VM becomes unchanged, thereby making it "cold" and also eligible to be migrated via live data migration (e.g., vMotion®). A virtual machine is represented by a flat file to which both reads and writes are directed. After creation of a hypervisor snapshot, a delta file is created to absorb new writes and read of those locations, and the flat file is used to read previously-written data. This means that when a live migration request is made, the data can be copied from one storage device to another storage device.

A storage array-based snapshot is taken (806). The snapshot is taken of the target VM and the set of delta files. The storage array-based snapshot may be linked to one or more previously generated storage array-based snapshots of the target VM. In various embodiments, the storage array-based snapshot is taken after existing snapshots are migrated from a source device to a destination device and prior to the beginning of live migration to limit the lifetime of a delta file. Most of the data has already been copies to the destination as part of other snapshots at 802, so the snapshot taken in 806 is a relatively small delta from the last snapshot sent in 802. In other words, the difference is minimized because the snapshot is taken after the hypervisor has taken its snapshot.

In various embodiments, the process wait for the snapshot taken at 806 to be migrated before proceeding to request a hypervisor to begin live migration at 808. This is so that by the time the hypervisor is called to begin migration, the data is already present on the destination.

In various embodiments, authentication and connection details about the source device are provided to the destination device. In various embodiments, a filesystem associated with a source device or destination device relies on the VM load balancing server to provide connection and authentication details for each live migration (vMotion®) request. For example, the filesystem uses some of the following information to communicate with the source device: replication port on the source, authentication key for the source, list of data IPs used by the destination, and data IP used by the destination while configuring destination configuration for the replication channel. If any of these attributes are changed during a live migration operation, the information is updated on the filesystem because if an entry becomes stale on the filesystem offloading, is not honored by the filesystem, in some embodiments.

The hypervisor is requested to begin live migration (808). For example, the VM load balancing server initiates a live migration (e.g., vMotion®) via a hypervisor and waits for the migration to complete. During live migration, a hypervisor sometimes asks a storage system (e.g., the VM load balancing server) to copy a file. When this happens, the VM load balancing server checks whether the file is unmodified on the source. If the file is unmodified, success is returned to the hypervisor. Otherwise, in various embodiments, if the file has been modified, a failure is indicated. An example of live migration is described in FIG. 9.

After live migration is complete, clean up is performed (810). In various embodiments, the flat file migrated by the live migration is checked and the replication states are cleaned up. Clean up removes replication relationships. For example, the storage array-based snapshot(s) created at 806 are deleted, and the hypervisor snapshot(s) created at 808 are deleted. Authentication and connection details are cleared from the destination device. In some embodiments, expiration policies are set on storage array-based snapshot(s) taken as part of process 800. For example, there is a default VAAI expiration value such as one day. The expiration policies provide an addition check so that if a workflow fails or filesystem crashes, there is a way to delete snapshots. In some embodiments, a snapshot replication link is not throttled for vMotion. Instead, the quality-of-service policy can limit the link usage per VM. In various embodiments, the hypervisor snapshot taken at 804 is deleted.

FIG. 9 shows an example of a process for migrating live data between storage devices. The process can be performed by the cooperation of a VM load balancing server (e.g., Tintri®), source device, hypervisor manager (e.g., vCenter® Server), destination device, and hypervisor host (ESX®) as shown. The process includes some of the steps of FIG. 8, and also shows additional steps performed by devices other than the VM load balancing server.

The live data migration involves orchestration with a hypervisor (e.g., server 206 of FIG. 2) to offload a copy of live data to the VM load balancing server (e.g., server 112 of FIG. 1). Because the VM load balancing server helps with live data migration and the VM load balancing server is aware of the source and destination devices, the VM load balancing server can preload the destination. This means that the offload happens nearly instantaneously from the perspective of the hypervisor. This improves the functioning of the computer by increasing the speed and efficiency of live data migration.

Replication begins (1) with a request by the VM load balancing server to the source device. In various embodiments, every storage array-based snapshot (e.g., Tintri® snapshot) available for the target VM is replicated (2). The target VM refers to the VM associated with the live data migration request. Then, the VM load balancing server requests the hypervisor manager to take a hypervisor snapshot (3). The hypervisor snapshot is taken on the target VM so that live migration (vMotion®) of disks is offloaded to the storage array associated with the VM load balancing server. As described above, the hypervisor snapshot includes a set of delta files to which new writes to the target VM will be written.

Then, the VM load balancing server instructs the source device to take a snapshot (4). A storage array-based snapshot is taken on the target VM. New writes are collected/applied onto the set of delta files and the hypervisor is configured to move these delta files. The storage array-based snapshot of flat virtual machine disks (e.g., vmdks) represents the flat file (e.g., flat-vmdk) as seen by the hypervisor host. In various embodiments, storage array-based snapshot (4) is taken after the hypervisor snapshot (3) to ensure that the array snapshot contains the exact data that the hypervisor will later ask the storage system to copy and an offloaded copy would not be missing writes that the hypervisor had made. If the array snapshot is taken first, then data would still be written to the flat file, and the contents of that file would not match what was in the array snapshot. The hypervisor snapshot "freezes" the existing files (e.g., just a flat file or a flat file and several previous hypervisor snapshot's delta files. In various embodiments, performing (1), (3), and (4) in the order shown improves efficiency because the lifetime of the delta file is relatively short. Migrating data before the live migration request (7/8) means that the hypervisor-visible length of the migration operation is relatively short.

The VM load balancing server waits for the new and any previously created storage array-based snapshots to be replicated to the destination device (5). When all snapshots have been replicated, the VM load balancing server proceeds to prepare for live migration by connecting or authenticating with a destination device (6). The VM load balancing server requests the hypervisor manager to begin live migration (7). In VMware®, this is a request to initiate storage vMotion®. More specifically, the hypervisor manager instructs the hypervisor host to migrate data (8). This causes the hypervisor to move the set of delta files of the target VM from the source device to the destination device.

Data migration proceeds with the hypervisor host instructing a destination device to make a copy of a file (9). The clone file may be a VAAI remote clone file. The destination device confirms the replication channel to the source file system (10). The destination device requests a snapshot ID and a source file ID (11). As mentioned above, the request from the hypervisor includes a source IP and file path. This IP is used to identify which source device to contact using the authentication information discussed earlier. The request (11) is for a snapshot and file within the snapshot that corresponds to the file name that is requested to be copied. The source device responds by providing the snapshot ID and source file ID (12).

In some embodiments, error handling is provided (13-15). For example, if an error such as replication not being complete, time out, or changes found in a source, the VAAI clone is failed, and the hypervisor falls back to non-offloaded live migration.

Steps 9-12 or 9-15 may be repeated for each vmdk file. From the perspective of the destination device filesystem, a VAAI clone request for each of the flat vmdks for the target VM is received sequentially. Because the VM load balancing server waited for all of the storage array-based snapshots to be replicated to the destination device before requesting a live migration (vMotion®) operation, the latest snapshot for the flat-vmdk of the target VM is already available on the destination device. A clone is created from this latest snapshot of the target VM to the flat-vmdk file on the destination device. In various embodiments, if the latest snapshot if not available on the destination device, a VAAI clone request is rejected.

Upon completion of the live data migration, integrity is checked and cleanup is performed. In various embodiments, a file name is mapped on the destination to a corresponding snapshot replicated from source storage array to ensure that the correct replicated snapshot is cloned into the file when a vdisk is created on storage migration. In various embodiments, the hypervisor snapshot (e.g., set of delta files) created by the VM load balancing server is removed (18). The relationship between source and destination VM stores is cleaned up (19). For example, the VM load balancing server instructs the source device to remove storage array-based snapshots (20) and instructs the destination device to remove storage array-based snapshots (21).

In various embodiments, source and destination devices are configured to communicate even if there are different dataIPs for replications and NFS (IP received on VAAI message).

Errors may occur during offloading. Errors such as a snapshot being unavailable on a destination device, a snapshot replication channel (authenticated channel) being unavailable, authentication being incomplete, disconnects between source and destination devices, data being written to migration offloaded files of a source VM after the snapshot was taken on the source device, VAAI operation time outs (e.g., communication with a source device or cloning of replicated snapshot took longer than VAAI timeout) can be addressed by dishonoring the offload operation.

In various embodiments, data is not corrupted if a VAAI operation times out and a byte-by-byte copy vMotion® is triggered by VMware ESX® host. Offloaded migration ensures data integrity on the migrated VM, in various embodiments. For example, replication integrity is verified by checking for files on the source that have checksum records.

The following figures show examples of offloading in a Microsoft Hyper-V environment. In a Microsoft® Hyper-V environment, the typical file protocol used is SMB and the offload control is called "remote ODX" (offloaded data transfer).

Unlike VAAI in VMware®, which is typically an all-or-nothing call, remote ODX allows data to be transferred in batches, e.g., by translating between a continuous background copy and the batch "write" requests from the client. In some embodiments, the hypervisor environment is used to avoid showing partial copies, because partial copies need not be shown for Hyper-V (typically Hyper-V involves offloading only complete copies or migrations), although it may be useful for other SMB clients.

The example process described below finds application in fast file copy of large files between storage devices. Currently, the client (e.g., a hypervisor such as Microsoft® Hyper-V®) copies data between two storage devices by performing reading and writing operations that involve two network round trips. The data transfer can be optimized as more fully described below. In various embodiments, the source and target devices can be in different active directory domains, and the target storage device can obtain service tickets for the source storage device.

Remote ODX can be triggered in various ways. Some example ways of triggering remote ODX are: copying VM templates (e.g., skeleton for a VM, using which others VMs can be created) from one storage device to another storage device, user triggered storage migration of a VM, and load balancing (e.g., the VM load balancing server calls into a storage device, which in turn calls into Hyper-V to perform a storage migration of a VM to another storage device).

FIG. 10 shows an example of performing a remote offload. Here, the remote offload is remote ODX. Although not shown, the devices can be coupled over a data network.

First, a hypervisor checkpoint (similar to a snapshot) is taken so that the new writes go to the delta file and the main disk is frozen. The hypervisor moves the delta file, and the main disk is moved as part of remote ODX. In this example, ODX includes two SMB iocticalls: a "read offload ioctl" and a "write offload ioctl."

Referring to 1001 of FIG. 10, the OS client 1070 (e.g., Hyper-V® client) sends an "offload read" command to source storage device 1050. For example, a FSCTL_OFFLOAD_READ_ioctl code is sent to initiate an offload read for a block of data in the source device. SMB 10 control commands refer to specialized commands issued by OS client 1070 on files to effect specialized behavior. A specific mechanism triggered by an ioctl depends on the ioctl command code. Input/output control ("ioctl") is a system call for device-specific input/output operations and other operations which typically cannot be expressed by regular system calls.

Referring again to 1001, source device 1050 replies with an ODX token, which contains a file ID of the file to be copied, source service principal name for the destination to authenticate to, file size, a UUID (e.g., realstoreFileSystemUUID), along with other fields. In various embodiments, the ODX token is a token that describes the data to be copied, and is opaque to the hypervisor (OS Client 1070) but meaningful to the source and destination systems (i.e., it encodes the file ID, service principal name, UUID, etc.)

When the read offload request is received, the file offset is checked. In some embodiments, only full file copies are supported, so if the offset is not zero, the ioctl is failed with an unsupported status as.

Referring to 1002, OS client 1070 receives this token and then creates the destination file, opens an exclusive handle to it and initiates an offload write for a block of data (e.g., invokes FSCTL_OFFLOAD_WRITE) on destination device 1060. The offloaded write request includes the token obtained from the source device. In some embodiments, destination device 1060 checks the realstoreFileSystemUUID to make sure the call is not coming from the same device but from a different device. If the call is from the same device, then local ODX is performed. Referring again to 1002, destination device 1060 responds with an asynchronous reply to the FSCTL_OFFLOAD_WRITE ioctl.

At the time of token generation in the response to the read offload ioctl on the source file, the destination is unknown. The destination, can be determined as follows. Referring to 1003, destination device 1060 uses a source service principal name (SPN) to acquire service tickets for source device 1050 from domain controller 1080 so that a new SMB session can be setup between them. The SPN is a name that is looked up in the Active Directory service (the domain controller) to identify which source device to communicate with.

Referring to 1004, using SMB client 1060, which is built in the filesystem, a SMB session is established to source device 1050 and a built in pipe (e.g., Tintri® ODX) is opened. In some embodiments, a request to send and receive data on a pipe (e.g., FSCTL_PIPE_TRANSCEIVE ioctl) is made on the established pipe. A blob of data including an internal structure with information for initiating replication is sent. The blob of data can include information like destination auth key, destination directory, destination 10g IP address, fileId of the file to be copied, source FS GUID, which can be used to set up a replication channel between source device 1050 and destination device 1060.

Upon receipt of the first offload write ioctl request on the destination file on destination device 1060, the following actions are taken. In some embodiments, if the source is not local, the SPN is extracted from the token. A service ticket is acquired for source device 1050 from the Active Directory Domain Controller using the various Kerberos APIs.

Using the SMB client built into the filesystem, an SMB session is established to source device 1050 (from the SPN). For example, commands such as "smb negotiate protocol," "smb session setup," and "smb tree connect to the special tintriODX$ share." In various embodiments, the builtin "/tintriODX" pipe is built using the smb open command. A control channel from the source to the destination is thus established.

An example of a command structure that sets up the replication configuration on the copy source and starts replication is:

1) A shared secret for setting up the replication protocol connection (1007 of FIG. 10)
2) Destination directory: a unique directory per replication operation. The directory name is created using the destination file open handle's unique attributes createGuid+clientGuid under a special ODX hidden directory (.tintriODX/"createGuid+clientGuid")
3) IP address (e.g., a data network interface chosen by the destination as the preferred data path)
4) Source file system globally-unique identifier (for validation, retrieved from the token)
5) FileId of the file to be copied In various embodiments, the tintriODX$ share is hidden from the regular data path and SM (by filtering smbEnumerateShares( ) query). In various embodiments, the tree connect to this share is always encrypted.

In various embodiments, there is a small slow path thread pool that establishes outgoing SMB connections and processes the commands and responses. The first SMB offload ioctl is responded to with a STATUS PENDING response, a request for an outgoing SMB connection will be queued up with the new thread pool and the SMB thread will be given up. The new pool threads can afford to wait on responses from the peer SMB server and domain controller. A timeout period is configured for these threads that is less than the SMB timeout so that there will be a success/failure response for the Windows® client before it times out. The number of threads and the number of requests that can be queued up will be tunables (e.g., how many concurrent remote ODX operations to allow before failing with STATUS INSUFFICIENT RESOURCES).

Referring to 1005, the file system GUID is validated on source device 1050 and the source file open handle is validated using volatile ID. Replication setup at source device 1050 can be performed by replication engine 1054 as follows. A file system guId is validated and a source file open handle is validated, e.g., using volatileId. The replication destination is set up a destID returned by API realstoreReplManager→createReplDestination( ). In various embodiments, this API takes a SMFlags attribute as input, which distinguishes regular user configured replication and migration triggered replication. Correspondingly, there may be another special flag value for remote ODX so that this does not interfere with other replication operations and is not visible from the UI.

Referring to 1006, a snapshot of the source file is taken. For example, a snapshot of the source file is taken with attributes HYPERV_SNAPSHOT and ODX GENERATED SNAPSHOT with reuse=true. This labels the snapshot as a specific type of snapshot (Hyper-V®) and generated for offloading purposes. The snapshot can be reused.

Referring to 1007, a one shot replication configuration is created using the destId and snapshotId. This allows replication to start over the replication channel. Using this replId, the internal repl instance UUID that is shared between the source and the destination is retrieved by replying to the FSCTL_PIPE_TRANSCEIVE ioctl with a response that includes a status success and the internal repl instance UUID as a payload.

In various embodiments, failure in any of the above steps results in a failed response to the pipe transceive ioctl, which is translated into failure response to the original write offload ioctl. In case of a timeout, the command cleanup is failed subsequently at both sites according to cleanup algorithms (same with failover in either source/destination while this command is still in flight).

Referring to 1008, the number of bytes replicated on the dest is monitored using the internal repl instance UUID. Once the LogicalBytesReplicated==fileSize (from the token), then the client sends a close on the open handle. Referring to 1009, as part of the close of the open handle, the file to its actual destination is renamed from the replicated source file.

Subsequent operation on destination device 1060 may proceed as follows. The internal repl instance UUID is persisted with the persistent open handle on the destination. Along with this, a flag marking the stage of the operation is also persisted, just like the current ODX operation (REMOTE_ODX_STARTED) (4 bits in open handle persistent data currently). This helps track the state of the operation and cleanup. For such an ODX operation, it is typical to receive a stream of write offload ioctls on this destination handle, each with a sourceOffset, copyLength, and destinationOffset.

For each such ioctl, using the repl instance UUID stored with the handle, the number of logical bytes replicated so far is queried. For the write offload ioctl response, the following is computed:

BytesTransferred=LogicalBytesReplicated−destinationOffset (if greater than 0, else 0)

In various embodiments, 0 is an acceptable response and the client will retry using the same values again. BytesTransferred !=copyLength is also acceptable. The client will adjust the values on the next ioctl call.

The operation is completed once LogicalBytesReplicated=fileSize (from the token). Validation is performed using another replication API, which checks if the replication is complete at the destination given a repl instance UUID. At this point, it is checked if the replicated file has been renamed to the destination directory. The state is persisted as (REMOTE ODX COMPLETE).

The security descriptor and file attributes of the stub destination file are then copied to the replicated file.

The client then closes the handle. As a part of the handle close the destination one shot configuration is deleted using the internal repl UUID). The replicated file should be present in the destination directory (.tintriODX/"createGuid+clientGuid"/). Just like the current ODX operation, the replicated file is atomically named to the stub destination file and the handle is closed.

In various embodiments, after the remote ODX process is completed, cleanup of data (e.g., transferred live data and/or snapshot data) is performed at source device 1050. In various embodiments, after Hyper-V performs live data migration, cleanup is performed. For example, replication configurations, internal replication file, SMB state are cleaned up on the source and destination device after the copy completes or is cancelled. Cleanup works regardless of the state of the Hyper-V® host or peer source/destination devices. The SM snapshot delete service cleans up the ODX snapshots after replication is complete or is cancelled.

In various embodiments, a continuously running SMB housekeeping thread that cleans up idle sessions, connections, etc., is used to cleanup any remaining configurations. One example configuration is normal cleanup. For example, the destination one shot config is marked as deleted using the repl instance UUID. An API takes care of cleaning up the destination config, cleanup incomplete internal repl file, and communicates to the source to cleanup the one shot source config on its end. The SMB housekeeping thread on the source queries all repl destination configurations, checks if SMFlags==REMOTE_ODX_FLAGS and attempts to delete them. If there are any child one shot configs alive, this is expected to fail and the deletion will be reattempted.

Another example configuration handles a situation in which the OS client crashes or is otherwise unavailable in the middle of the operation. In various embodiments, a crash results in the SMB session to the destination being closed and hence the ODX open handle being closed. If the ODX_STAGE==REMOTE_ODX_STARTED, the destination repl configuration is deleted and the handle is deleted. SMB housekeeping thread on the source cleans up the destination configuration. If ODX_STAGE==REMOTE_ODX_COMPLETED, the replicated file is atomically renamed to the destination file and the open handle is deleted.

Another example configuration handles a situation in which a destination failover/network disruption between client and destination. Since the open handle is persistent and replication operation is failover tolerant, failover resumes if the client reconnects. If not, then the handle is stale and is deleted by the SMB stale handle cleanup thread (same with network disruption). In this case (staleHandleCountDown_==0 in the handle distinguishes normal closes vs stale closes), the dest repl configuration is cleaned up. If the ODX_STAGE==REMOTE_ODX_COMPLETED, then the replicated file is also cleaned up. In some embodiments, this is performed because since the client chose to not reconnect and close the handle explicitly, it has abandoned the handle and the ODX operation and will most likely retry on a new handle resulting in a new ODX operation.

In some embodiments, another layer of cleanup is added in case the replication source or destination is unavailable for an indeterminate amount of time. Based on a tunable time value (e.g., one to two days) since the creation of source and destination one shot repl configs for remote ODX, if they are still around are deleted by the SMB housekeeping thread. These are filtered by the Remote ODX SMFlags.

In various embodiments, a snapshot taken for the ODX operation is identical to the current ODX snapshot. The policy is deleted on zero references and deleted after a user-selectable fixed time period (e.g., 10 minutes).

In various embodiments, destination cleanup is performed as follows. An operation is determined to have been completed successfully, if a handle is active (not stale), the replicated file is in a destination direction (e.g., destination configuration is deleted automatically), an ODX stage is marked as complete, the file is renamed, and the handle is deleted atomically. An operation is determined to be unsuccessful if replication is incomplete. The destination configuration is marked as deleted. If replication is completed, the replicated file is removed from the destination directory, and the handle is closed. If replication is paused, offset is 0, and for a tunable amount of time (or ODX write offload commands) the replication destination configuration does not appear on the destination, the ioctl is failed and the replId is erased from the handle. The client then transparently starts the copy. If for a tunable amount of time (or ODX write offload commands) the number of logical bytes replications is 0, the ioctl is failed and replId is erased from the handle. If the offset is not zero and for a tunable amount of time (or ODX write offload commands) the number of logical bytes replicated is 0, ioctl is failed, the destination configuration is marked as deleted, and the handle is closed. The client gets an error because the handle is not found, and the next retry automatically defaults to a non-ODX copy for that file in some embodiments.

In various embodiments, the SMB housekeeping thread proceeds as follows.
  Query all destination configurations filter with remote ODX SM flags
  Query all open handles
  Check to see if there is a handle.replId=destConfig.replId
  If none found mark the config as deleted
  Check all remote ODX directories.tintri/ODX/openGuid+clientGuid
  If none of the open handles match openGuid+ClientGuid delete the directory and any file inside it In various embodiments, source cleanup is performed by cleaning up the source one shot configuration once replication is complete via delete from destination through the replication protocol (new API on destination side).

In various embodiments, the SMB housekeeping thread proceeds as follows.
  Query all replication destinations
  Filter using remote ODX SM Flags
  Query all the child one shot repl configs
  For each one shot source config, if replication complete, delete it
  For each one shot source config if (current time−creation time)>tunable timeout (½ days)
  Delete the one shot config
  Delete the repl destination, if any child one shot config exists this will fail, then continue The techniques for offloading of live migration described above improves the functioning of a computer and the technical field of data migration in many ways. In one aspect, storage offloading of the live migration operation frees the hypervisor from some data transfer responsibilities, which saves data bandwidth and CPU processing on the hypervisor. In another aspect, offloaded transfers can efficiently detect sparse regions and enable transfer of only data involved in the migration. In yet another aspect, offloaded transfers enable the use of optimizations such as deduplication/compression over the wire. Moreover, the rethinning on migration of VMs is mitigated. Rethinning is a problem that typically occurs when snapshot data and live data are sent separately (e.g., in a non-offloaded fashion). Some blocks of data shared between them are sent twice. If the destination storage device cannot de-duplicate this data, then space usage increases compared to the original space usage on the source. With cloning-based offload in place, the data is sent only once (as part of the snapshot) and then the corresponding live data is simply a reference back to the data in that snapshot. This ensures that the data that was common between live data and snapshot data on the source is also common between live and snapshot on the destination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   migrating existing snapshots of a virtual machine (VM) from a source storage device to a destination storage device, wherein the existing snapshots include at least one storage array-based snapshot of the VM stored by the source storage device at a time prior to said migrating;
   requesting a hypervisor to take a hypervisor snapshot of the VM, wherein taking the hypervisor snapshot freezes existing files by (1) the hypervisor storing a first state of the VM in a flat file and (2) the hypervisor storing in a set of delta files file operations on the VM after the first state of the VM as stored in the flat file; wherein the hypervisor snapshot includes the flat file and the set of delta files;
   taking a storage array-based snapshot prior to live migration, after requesting the hypervisor to take the hypervisor snapshot, and after the existing snapshot migration from the source storage device to the destination storage device, wherein the storage array-based snapshot is linked to at least one of the migrated existing snapshots and wherein taking the storage array-based snapshot includes taking, by the source storage device, a snapshot of the flat file and the set of delta files; and
   migrating to the destination storage device the storage array-based snapshot taken after requesting the hypervisor to take the hypervisor snapshot; and
   after migrating to the destination storage device the storage array-based snapshot taken after requesting the hypervisor to take the hypervisor snapshot, requesting the hypervisor to migrate live data from the source storage device to the destination storage device;
   determining that a write to a cold virtual disk for the migrated VM is unintentional including by instructing the destination storage device to verify that the virtual disk is no longer cold; and
   returning an error in response to the determination that write is unintentional.

2. The method of claim 1, wherein requesting the hypervisor to take a hypervisor snapshot makes a file cold and eligible for offloading live data migration from the hypervisor to a VM load balancing server, wherein a cold file is a file in which only reads are allowed.

3. The method of claim 1, wherein the hypervisor snapshot includes the set of delta files to which subsequent writes to the VM being migrated is written.

4. The method of claim 3, wherein:
   subsequent writes are performed to at least one delta file of the set of delta files,
   a warm file becomes a cold file in response to the taking of the hypervisor snapshot,
   a cold file is a file in which only reads are allowed, and
   a warm file is a file to which writes are allowed.

5. The method of claim 1, wherein the storage array-based snapshot is taken prior to requesting the hypervisor to migrate live data from the source storage device to the destination storage device.

6. The method of claim 1, wherein the storage array-based snapshot includes the VM being migrated and the set of delta files associated with the VM.

7. The method of claim 1, wherein the method is performed by a VM load balancing server in a storage device including an association between a file and a VM, and the VM load balancing server is configured to provide authentication and connection information about the source storage device to the destination storage device.

8. The method of claim 1, further comprising removing replication relationships including by checking replication integrity including by checking for files on the source storage device that have checksum records.

9. The method of claim 1, further comprising:
   determining that an error has occurred; and
   performing clean up on the destination storage device in response to the determination that an error has occurred, including at least one of: removing a replication relationship, clearing authentication and connection details from the destination storage device, or setting an expiration policy.

10. The method of claim 1, further comprising setting an expiration policy such that the storage array-based snapshot is automatically removed according to the expiration policy.

11. The method of claim 1, further comprising offloading live data migration simultaneously between (i) the source storage device and the destination storage device and (ii) another source storage device and the destination storage device.

12. The method of claim 1, further comprising mapping a file name on the destination storage device to a corresponding snapshot replicated from the source storage device.

13. The method of claim 1, wherein the requesting a hypervisor to take a hypervisor snapshot includes requesting a read for a block of data such that live data migration is performed block-by-block.

14. The method of claim 13, further comprising copying a cold virtual disk from the migrated existing snapshots.

15. The method of claim 1, wherein:
   the hypervisor snapshot is of the VM as stored on the source storage device, and the taking of the hypervisor snapshot causes a warm file to become a cold file and eligible for live data migration.

16. The method of claim 1, wherein further comprising causing the storage array-based snapshot to be taken by a storage device.

17. A system comprising:
   a communication interface configured to receive a request to migrate a virtual machine (VM) from a source storage device to a destination storage device; and
   a processor coupled to the communication interface, the processor configured to:
     migrate existing snapshots of a virtual machine (VM) from a source storage device to a destination storage device, wherein the existing snapshots include at least one storage array-based snapshot of the VM stored by the source storage device at a time prior to said migrating;

request a hypervisor to take a hypervisor snapshot of the VM, wherein taking the hypervisor snapshot freezes existing files by (1) the hypervisor storing a first state of the VM in a flat file and (2) the hypervisor storing in a set of delta files file operations on the VM after the first state of the VM as stored in the flat file; wherein the hypervisor snapshot includes the flat file and the set of delta files;

take a storage array-based snapshot prior to live migration, after requesting the hypervisor to take the hypervisor snapshot, after the existing snapshot migration from the source storage device to the destination storage device, wherein the storage array-based snapshot is linked to at least one of the migrated existing snapshots and wherein taking the storage array-based snapshot includes taking, by the source storage device, a snapshot of the flat file and the set of delta files;

migrate to the destination storage device the storage array-based snapshot taken after requesting the hypervisor to take the hypervisor snapshot;

after migrating to the destination storage device the storage array-based snapshot taken after requesting the hypervisor to take the hypervisor snapshot, request the hypervisor to migrate live data from the source storage device to the destination storage device;

determine that a write to a cold virtual disk for the migrated VM is unintentional including by instructing the destination storage device to verify that the virtual disk is no longer cold; and return an error in response to the determination that write is unintentional.

\* \* \* \* \*